US008061717B2

(12) United States Patent
Roth

(10) Patent No.: US 8,061,717 B2
(45) Date of Patent: Nov. 22, 2011

(54) POSITIONING AND CLAMPING DEVICE FOR TOOLS AND/OR WORKPIECES

(75) Inventor: Walter Roth, St. Gallen (CH)

(73) Assignee: System 3R Schweiz AG, Flawil (CH)

( * ) Notice: Subject to any disclaimer, the term of this patent is extended or adjusted under 35 U.S.C. 154(b) by 930 days.

(21) Appl. No.: 12/065,907

(22) PCT Filed: Jun. 10, 2006

(86) PCT No.: PCT/EP2006/005586
§ 371 (c)(1),
(2), (4) Date: Mar. 6, 2008

(87) PCT Pub. No.: WO2007/031123
PCT Pub. Date: Mar. 22, 2007

(65) Prior Publication Data
US 2008/0237958 A1    Oct. 2, 2008

(30) Foreign Application Priority Data
Sep. 9, 2005 (EP) .................................... 05019647

(51) Int. Cl.
*B23B 31/103* (2006.01)
(52) U.S. Cl. ....... 279/2.12; 279/121; 279/157; 269/309; 269/310
(58) Field of Classification Search ............... 279/2.11, 279/2.12, 2.13, 2.1, 2.09, 4.12, 121, 157; 269/309, 310
See application file for complete search history.

(56) References Cited

U.S. PATENT DOCUMENTS

| 1,566,370 | A | * | 12/1925 | Briscoe | 82/165 |
| 1,873,515 | A | * | 8/1932 | Warren | 279/2.11 |
| 2,535,246 | A | * | 12/1950 | Welch et al. | 279/2.11 |
| 3,086,783 | A | * | 4/1963 | Kelso | 279/2.06 |
| 3,978,767 | A | * | 9/1976 | Levin | 409/164 |
| 4,534,116 | A | * | 8/1985 | Davis | 42/121 |
| 5,961,261 | A | | 10/1999 | Stark | |
| 6,089,557 | A | * | 7/2000 | Obrist | 269/309 |
| 6,378,877 | B1 | * | 4/2002 | Luscher et al. | 279/2.09 |
| 6,641,127 | B2 | | 11/2003 | Haruna | |
| 6,905,117 | B2 | * | 6/2005 | Bernhard et al. | 269/309 |
| 6,997,448 | B2 | | 2/2006 | Roth et al. | |
| 2005/0161887 | A1 | * | 7/2005 | Hisamoto | 279/2.12 |

FOREIGN PATENT DOCUMENTS

DE    10117485    10/2002

* cited by examiner

*Primary Examiner* — Eric A Gates
*Assistant Examiner* — Paul M Janeski
(74) *Attorney, Agent, or Firm* — Bachman & LaPointe, P.C.

(57) ABSTRACT

A positioning and clamping device or tools and/or workpieces, comprising a base body, a piston arranged such as to be displaceable in the base body, a pin which may be connected to the piston and at least one locking mechanism, for locking the positioning and clamping device relative to a tool or workpiece holder which has a complementary form to the base body. The base body has a cylinder housing for housing the piston with a clamping cone between the piston and the pin with control surfaces formed on the clamping cone and the piston, with further control surfaces on the locking mechanism, cooperating with the control surfaces of the clamping cone and the piston and the locking mechanism is arranged to be radially displaceable in the base body.

17 Claims, 5 Drawing Sheets

POSITIONING AND CLAMPING DEVICE FOR TOOLS AND/OR WORKPIECES

BACKGROUND OF THE INVENTION

The invention relates to a positioning and clamping device for tools and/or workpieces, comprising a basic body, a piston arranged such as to be displaceable in the basic body, a pin arranged such that it can be connected to the piston, and at least one locking means for locking the positioning and clamping device relative to a work or tool holder designed to be complementary to the basic body.

In the machine tool industry, workpieces are machined with computer-controlled tools in a "machining center". In order to accurately position the workpiece and hold it in place with respect to the tool, or vice versa, quick-action clamping systems are used. A quick-action clamping system ensures that the position of the tool or of the workpiece can be reproducible and accurately defined in the three-dimensional coordinate system which forms the basis for the control by the computer. If the tool or the machine tool has to be changed frequently in the course of the machining of the workpiece, it must be ensured for the computer control that the workpiece is always located again at the same place in the coordinate system.

A device of the generic type for the releasable retention of workpieces on machine tools is known from DE 10116229 A1. A cylindrical receptacle for a matching piston is formed in a basic body. The piston is moved in the Z direction against a spring force by a hydraulic or pneumatic medium. A clamping pin, which is connected to a pallet, is mounted in a ball sleeve such as to be movable in the Z direction. In the ball sleeve, a plurality of balls are arranged in a radially movable manner at the circumference of the clamping pin. Due to specially designed clamping surfaces on the clamping pin and on the piston, the clamping pin is centered and clamped in place by the movement of the piston.

Proceeding from this prior art, the object of the invention is to specify a positioning and clamping device which has an accuracy within the micrometer range, is composed of as few parts as possible and ensures a long service life and has as high a clamping and retaining force as possible.

SUMMARY OF THE INVENTION

The object is achieved by a positioning and clamping device for tools and/or workpieces, comprising a basic body, a piston arranged such as to be displaceable in the basic body, a pin arranged such that it can be connected to the piston, and at least one locking means for locking the positioning and clamping device relative to a work or tool holder designed to be complementary to the basic body, wherein the basic body is formed with a cylindrical receptacle for accommodating the piston, wherein a clamping cone is arranged between the piston and the pin, wherein control surfaces are formed on the clamping cone and on the piston, wherein further control surfaces interacting with the control surfaces of the clamping cone and of the piston are formed on the locking means, and wherein the locking means is arranged so as to be radially displaceable in the basic body.

It is advantageous that the positioning and clamping device ensures the highest possible reproducibility. This is achieved by Z seatings being formed on the outer circumference of the basic body. This is also achieved by the basic body having a conically designed centering surface on the outer side. This is also achieved by the conically designed centering surface being designed to be concentric to the cylindrical outer surface of the basic body. The basic body, which can be made in one piece, takes over all the functions that are necessary for precise clamping and centering of the workpiece.

It is also advantageous that the positioning and clamping device can easily be cleaned. This is achieved by horizontal and slot-shaped blow-out openings being formed in the basic body adjacent to the Z seating. This is also achieved by lines for the scavenging air which lead to the cylindrical receptacle being provided in the basic body.

BRIEF DESCRIPTION OF THE DRAWINGS

An exemplary embodiment of the invention is described with reference to figures. In the drawing.

DETAILED DESCRIPTION

Figure 1:
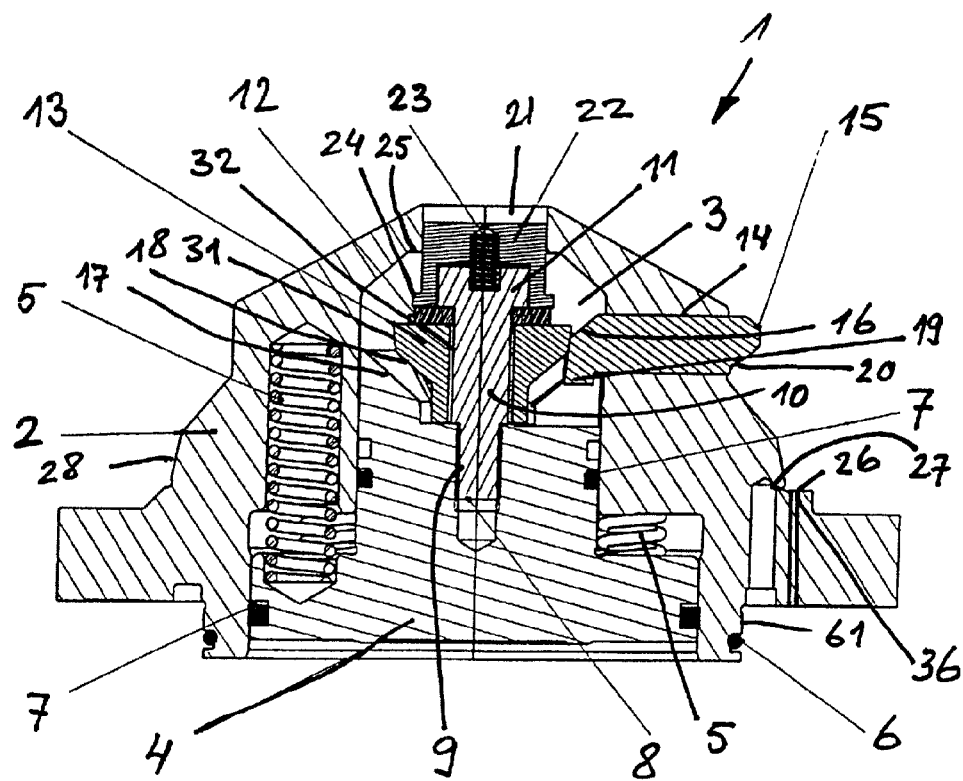
FIG. 1 shows a section through a positioning and clamping device according to the invention.
Figure 7:
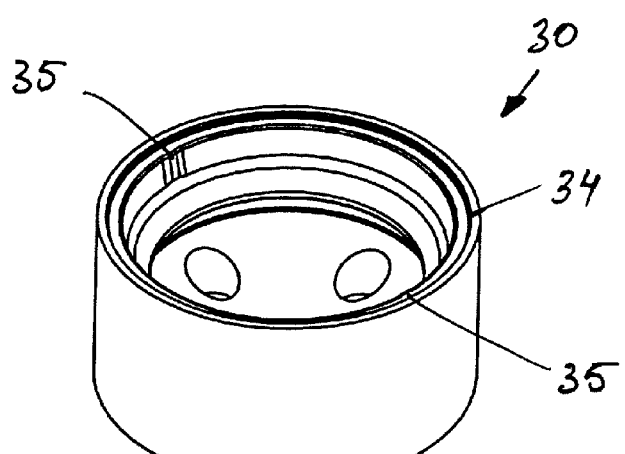
FIG. 7 shows a perspective view of a further work or tool holder of complementary design.
Figure 6:
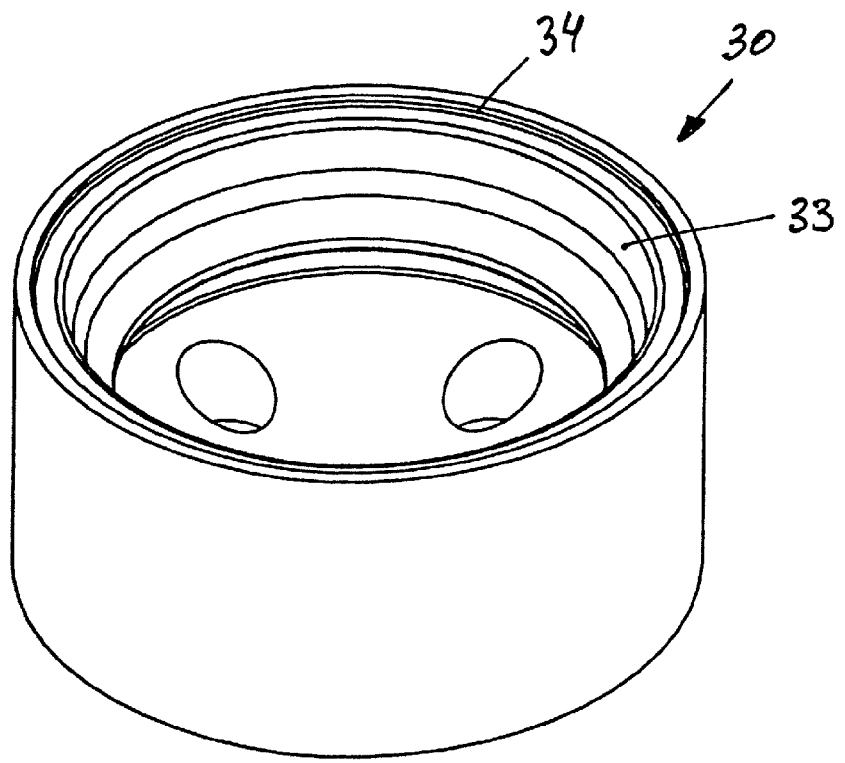
FIG. 6 shows a perspective view of a work or tool holder designed to be complementary to the positioning and clamping device.

A positioning and clamping device 1 is shown sectioned along the Z axis in FIG. 1. The Z axis in this case refers to the perpendicularly running axis in a coordinate system having three axes X, Y and Z. The positioning and clamping device 1 consists of a basic body 2, which can be fastened with the underside to a plate (not depicted here) or to a work table. Belonging to the positioning and clamping device 1 is a work or tool holder 30 which is designed to be complementary thereto and is shown in FIGS. 6 and 7. The basic body 2 has an essentially rotationally symmetrical shape. A cylindrical receptacle 3 for a piston 4 is formed in the basic body 2. The piston 4 can be moved in the direction of the Z axis. A hydraulic or pneumatic means is used for a movement of the piston 4 in the positive direction of the Z axis. Springs 5 and/or the pressure of the hydraulic or pneumatic medium serve for the movement in the opposite direction. Feed lines for the hydraulic or pneumatic medium are provided in the plate. For sealing relative to the plate, the basic body 2 has an O ring 6 at a cylindrical surface 61. The sealing between the piston 4 and the basic body 2 is ensured by special seals 7 having an X-shaped profile.

From the plate arranged below the basic body 2 or from the work table, the hydraulic or pneumatic medium is fed to the basic body 2 and to the underside of the piston 4. Running in the basic body 2 are lines which constitute an open connection, inter alia, to the space above the piston 4. Furthermore, lines leading to the receptacles for the springs 5 and to the cylindrical receptacle 3 are provided for the scavenging air, which is necessary for the cleaning of the positioning and clamping device 1. The piston 4 can therefore also be moved in the opposite direction by the pressure of the hydraulic or pneumatic medium instead of by the force of the springs 5. A combination of the spring force with the medium pressure for the positioning and clamping operation can also be applied.

A pin 8 is screwed in place in the piston 4 on the top side. The pin 8 is designed as a body-fit shoulder screw of precisely defined dimensions. The body-fit shoulder screw 8 comprises a threaded region 9, a shoulder region 10 and a head region 11. Between the head region 11 of the body-fit shoulder screw 8 and the piston 4, an annular thrust washer 12 and a clamping cone 13 are arranged one below the other in the shoulder region 10. The underside of the clamping cone 13 and the top side of the piston 4 run parallel to one another and are arranged at a uniform distance from one another. The thrust washer 12 serves to distribute the force which is exerted by the clamping cone 13 on the head region 11 of the body-fit shoulder screw 8.

Radially running apertures 14 are formed in the basic body 2 approximately at the same level as the clamping cone 13. Locking means 15 are arranged in a radially displaceable manner in these apertures 14. The locking means 15, the clamping cone 13 and the piston 4 have respective control surfaces 16, 17, 18 which are designed to interact with one another. The control surfaces 16, 17, 18 are designed, for example, as flanks, grooves or ribs which are all formed at the same angle of, for example, about 45° to the Z axis. The control surfaces 16, 17, 18 are arranged to run parallel to one another. This ensures that the radially moving locking means 15 are positively guided or positively controlled by the movement of the piston 4 and of the clamping cone 13. The locking means 15 are moved radially inward by the movement of the piston 4 upward, against the force of the springs 5. Conversely, the locking means 15 are moved radially outward by the movement of the piston 4 and of the clamping cone 13 downward. The clamping cone 13 has a central bore 32 having an inside diameter which is markedly larger than the outside diameter of the shoulder region 10 of the body-fit shoulder screw 8. As a result, the clamping cone 13 is mounted in a floating manner about the Z axis in the directions of the X and Y axis. This compensates for differences in the movements of the individual locking means 15 and achieves defined, uniform clamping of the complementary work or tool holder 30.

The locking means 15 are designed as slides or bolts having a rectangular or round cross section. The locking means 15 have a foot 19 at the end lying inside the basic body 2. The foot 19 ensures that the locking means 15 are captively arranged in the basic body 2. At the end lying outside the basic body, the locking means 15 have a profile 20 which is designed precisely for the work or tool holder 30 formed in a complementary manner to the basic body 2.

At the top, i.e. in the region having the largest cone diameter, the clamping cone 13 has a first conical surface 31, which is designed to run at an angle of less than 10° to the Z axis. The steep angle of the conical surface 31 ensures that self-locking can act between the locking means 15 and the clamping cone 13, said self-locking maintaining reliable and firm retention even if the medium pressure ceases or if the spring force is absent.

A further central bore 21 is formed at the top in the basic body 2 concentrically to the receptacle 3. A cap 22 is captively arranged in the bore 21. To this end, the cap is formed with a hat brim 24, as can be seen in FIG. 1. Instead of the hat brim 24, the cap 22 can be provided in the marginal region with a groove in which a snap or expanding ring is inserted, which, after insertion through the bore 21, expands and prevents said cap 22 from being removed again through the central bore 21. The cap 22 covers the head region 11 of the body-fit shoulder screw 8 and can be moved up and down in the direction of the Z axis. Arranged between the head 11 and the cap 22 is a spring 23 which ensures that the cap 22 is pressed outward from the basic body 2 in the unloaded state, i.e. without coupling to the complementary work or tool holder. Due to the fact that the cap 22 is arranged so as to project upward above the basic body 2, the complementary work or tool holder 30 can be brought up to the positioning and clamping device 1 and lifted off again as gently as possible. In the loaded state, the piston 4 presses the cap 22 upward until the top edge of the cap 22 is flush with the top edge of the basic body 2. The hat brim 24 or the clamping ring of the cap 22 is caught by a stop 25 of the basic body 2.

Figure 2:
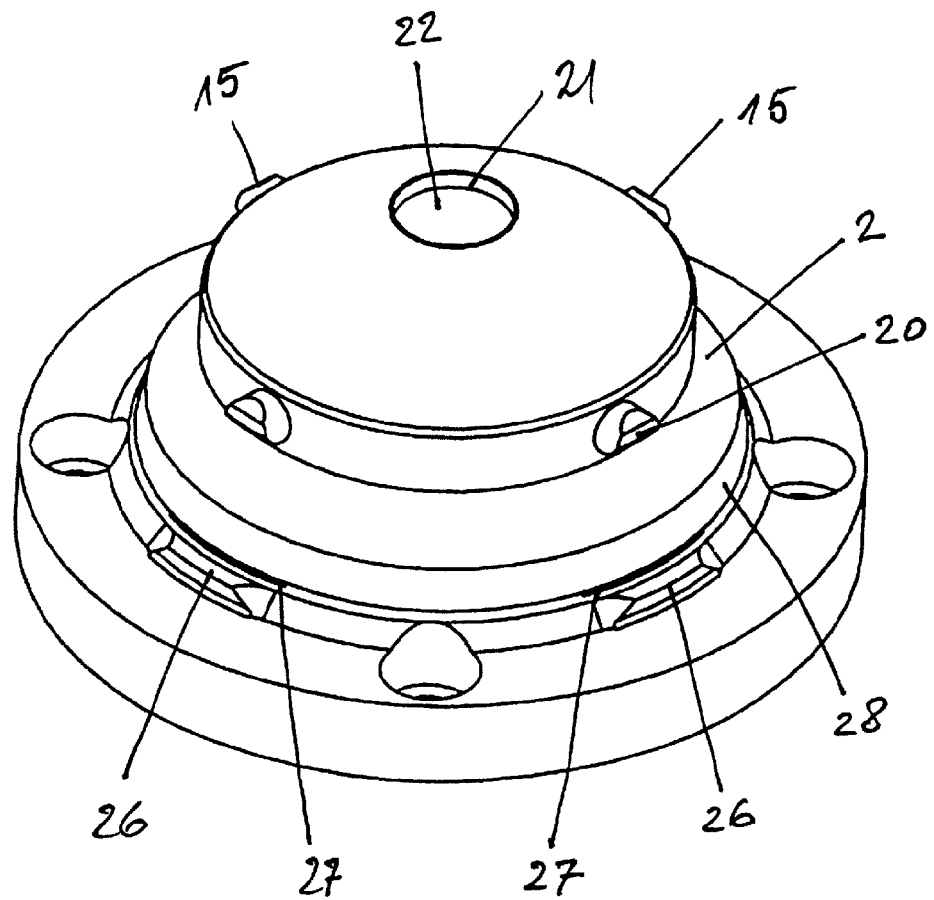
FIG. 2 shows a perspective view of the positioning and clamping device of FIG. 1.

The positioning and clamping device 1 is shown in perspective in FIG. 2. It can be seen here how four locking means 15 having the profile 20 are arranged at the outer circumference of the basic body 2. Furthermore, four Z seatings 26 are formed at the bottom on the basic body 2. A blow-out opening 27 is formed directly above each Z seating 26. The blow-out opening 27 is inclined slightly downward, i.e. it is arranged so as to be directed toward the Z seatings 26, and is of slot-shaped design. During the positioning of the complementary work or tool holder 30, the Z seating 26 is blown clean with compressed air through the blow-out slot 27. Furthermore, a conically running centering surface 28 is formed on the basic body 2. The centering surface 28 runs exactly concentrically to the cylindrical outer surface 61 of the basic body 2. The concentric arrangement of the outer surface 61 and of the centering surface 28 ensures that the positioning and clamping device 1 can be fastened and positioned in a precisely defined place on the plate or on the work table.

Figure 3:
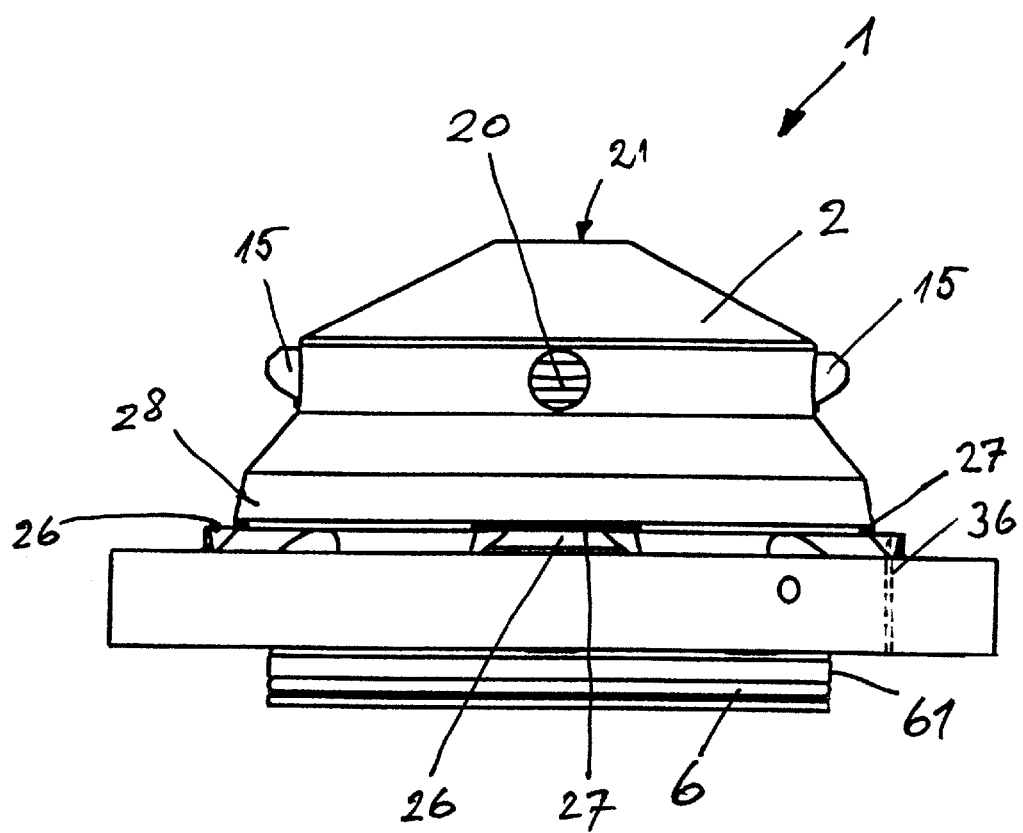
FIG. 3 shows a further view of the positioning and clamping device of FIG. 1, FIGS. 4a, b show a perspective view of a locking means for the positioning and clamping device of FIG. 1.

The positioning and clamping device 1 is shown in a side view in FIG. 3. The basic body 2 is designed to be rotationally symmetrical and so as to precisely match the complementary work or tool holder 30, which is shown in FIGS. 6 and 7. A presence control 36 is also indicated in FIG. 3. Formed in the Z seatings 26 is a small bore 36, through which the hydraulic or pneumatic medium flows, as long as no work or tool holder 30 is located on the Z seating 26. If the bore 36 is covered with the work holder 30, it can be established by means of a flow or pressure monitor that medium no longer flows and that the workpiece has been correctly positioned.

Figure 4A:
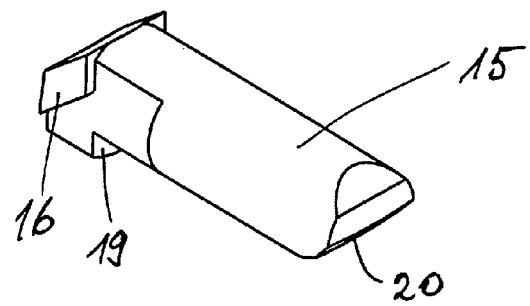
Figure 4B:
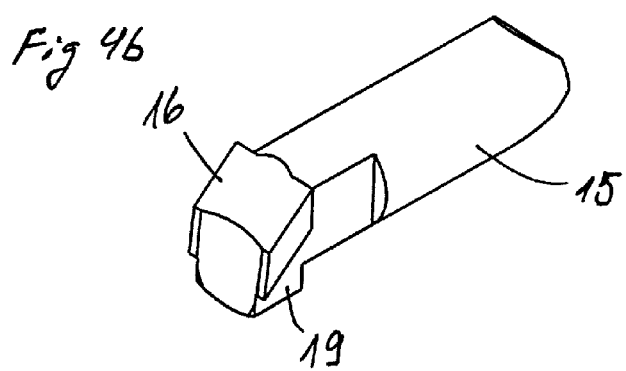
Figure 5:
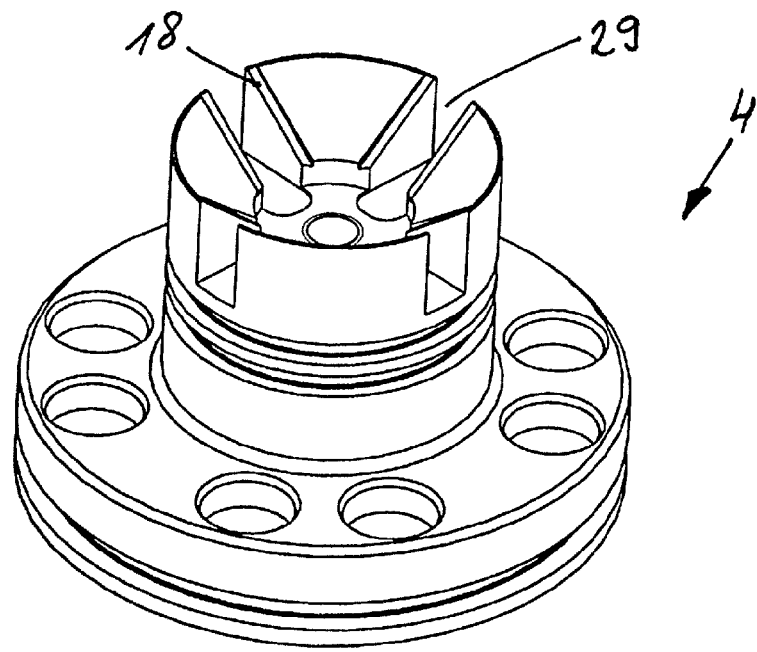
FIG. 5 shows a perspective view of a piston for the locking means of FIG. 4.

The locking means 15 is shown on its own in a perspective view in FIGS. 4a and 4b. The piston 4 is shown on its own in a perspective view in FIG. 5. The piston 4 has apertures 29, into which the locking means 15 can be moved inward or outward in the radial direction. The control surfaces 16, 18 can be seen on the locking means 15 and on the piston 4. Further matching control surfaces 17 are formed on the clamping cone 4. The control surfaces 16, 17, 18 ensure that the locking means 15 can be positively guided in both directions in the piston 4 and in the basic body 2.

No seals are arranged between the locking means 15 and the basic body 2 and between the cap 22 and the basic body 2, such that the scavenging air can escape here and the outside of the positioning and clamping device can be cleaned with compressed air right up to the moment when the basic body 2 touches the complementary work or tool holder 30.

Two variants of the complementary work or tool holder 30 are shown in perspective in FIGS. 6 and 7. More than one positioning and clamping device 1 is required for the positioning of large workpieces. Of said positioning and clamping devices, one is normally a device suitable for the "zero point centering" and one is a device suitable for fixing the workpiece in the X or Y direction. Other devices are not designed for positioning but rather for clamping and retention. The work holder 30 from FIG. 6 has a centering surface 33 which is designed to be continuously conical all round. The diameter of the conical centering surface 33 is adapted exactly to the diameter of the centering surface 28 of the positioning and clamping device 1. This ensures that positioning free of play, with minimum deformation of the devices to be coupled, becomes possible. The diameters of the conical centering surfaces 28 33 are designed in such a way that only deformation within the elastic range of the material will occur.

At the margin directed downward, the work or tool holder 30 has a protective rim 34 located in front of the centering surface 33. The protective rim 34 protects the centering surface 33 from contamination and damage. The work or tool holder 30 from FIG. 7 has two centering surfaces 35 arranged opposite one another. The work or tool holder 30 from FIG. 7 is therefore designed only for centering in the direction of the X or Y axis.

With the positioning and clamping device 1 according to the invention, a clamping system is offered which can also be used under high loading. Because the centering surfaces 28 of the basic body 2 are relatively large, and because the locking means 15 work without balls, the clamping force is distributed over areas instead over points. Precise positioning is achieved, which can still be reproduced even after a prolonged service life. The retaining force of the locking means 15 can be set substantially higher than in a device having balls without the risk of damage.

The invention claimed is:

1. A positioning and clamping device comprising a basic body, a piston displaceable in the basic body, a pin connected to the piston, and at least one locking means for locking the positioning and clamping device relative to a holder designed to be complementary to the basic body, wherein the basic body comprises a cylindrical receptacle for accommodating the piston, a clamping cone is arranged between the piston and the pin, in that control surfaces are formed on the clamping cone and on the piston, further control surfaces interacting with the control surfaces of the clamping cone and of the piston are formed on the locking means, and the locking means is radially displaceable in the basic body.

2. The positioning and clamping device as claimed in claim 1, wherein the further control surfaces of the locking means interact in a positive-locking manner with the control surfaces of the piston and of the clamping cone in such a way that positive control radially outward and inward with respect to a Z axis of the positioning and clamping device is achieved.

3. The positioning and clamping device as claimed in claim 1, wherein the pin is designed as a body-fit shoulder screw having a head region, a shoulder region and a threaded region.

4. The positioning and clamping device as claimed in claim 3, wherein the clamping cone has a central bore having a larger diameter than the shoulder region of the body-fit shoulder screw.

5. The positioning and clamping device (1) as claimed in claim 2, wherein the clamping cone, in the region of largest cone diameter, has a first conical surface which runs at an angle of less than 10° with respect to the Z axis.

6. The positioning and clamping device as claimed in claim 1, wherein seatings are formed on the outer circumference of the basic body.

7. The positioning and clamping device as claimed in claim 6, wherein blow-out openings are arranged in the basic body adjacent and parallel to the seatings.

8. The positioning and clamping device as claimed in claim 7, wherein the blow-out openings are arranged inclined slightly downward and are of slot-shaped.

9. The positioning and clamping device as claimed in claim 1, wherein the basic body has a conical centering surface.

10. The positioning and clamping device as claimed in claim 9, wherein the conical centering surface is concentric to the cylindrical outer surface of the basic body.

11. The positioning and clamping device as claimed in claim 1, wherein a central bore is formed in the basic body and passes through to the cylindrical receptacle.

12. The positioning and clamping device as claimed in claim 11, wherein a cap is provided in the central bore and is movable in a Z direction.

13. The positioning and clamping device as claimed in claim 4, wherein an annular thrust washer is arranged between the head of the body-fit shoulder screw and the clamping cone.

14. The positioning and clamping device as claimed in claim 12, wherein the cap is arranged between an annular thrust washer and a stop of the basic body in such a way as to be movable in the Z direction against a spring force.

15. The positioning and clamping device as claimed in claim 1, wherein the holder has a protective rim.

16. The positioning and clamping device as claimed in claim 6, wherein at least one seating is formed with a bore.

17. The positioning and clamping device as claimed in claim 1, wherein air lines are provided in the basic body and lead to the cylindrical receptable (3).

* * * * *